US012808647B2

(12) United States Patent

Jaquet et al.

(10) Patent No.: US 12,808,647 B2
(45) Date of Patent: Nov. 24, 2026

(54) ARTICULATED PROBE HEAD

(71) Applicant: HEXAGON MANUFACTURING INTELLIGENCE SÀRL, Renens (CH)

(72) Inventors: Christophe Jaquet, La Sarraz (CH); Léonard Wunderlin, Tolochenaz (CH); Claude Rouge, Baulmes (CH); Alessandro Nardulli, Bevaix (CH); Julien Chardonnens, Bulle (CH); Davide Manetti, Pully (CH)

(73) Assignee: HEXAGON MANUFACTURING INTELLIGENCE SÀRL, Renens (CH)

( * ) Notice: Subject to any disclaimer, the term of this patent is extended or adjusted under 35 U.S.C. 154(b) by 307 days.

(21) Appl. No.: 18/885,397

(22) Filed: Sep. 13, 2024

(65) Prior Publication Data

US 2025/0085096 A1 Mar. 13, 2025

(30) Foreign Application Priority Data

Sep. 13, 2023 (EP) .................................... 23197236

(51) Int. Cl.
*G01B 5/008* (2006.01)
*B25J 15/00* (2006.01)
*B25J 17/02* (2006.01)

(52) U.S. Cl.
CPC .......... *G01B 5/008* (2013.01); *B25J 15/0019* (2013.01); *B25J 17/0258* (2013.01)

(58) Field of Classification Search
CPC ...... G01B 5/008; B25J 5/0019; G25J 17/0258
USPC .......................................................... 33/503
See application file for complete search history.

(56) References Cited

U.S. PATENT DOCUMENTS 5,848,477 A * 12/1998 Wiedmann ........... G01B 21/047 33/DIG. 1
6,546,643 B2 * 4/2003 Lotze ................... G01B 21/045 33/503
7,100,297 B2 * 9/2006 McMurtry ........... G01B 21/042 33/561
7,213,344 B2 5/2007 Jordil et al.
7,415,775 B2 * 8/2008 Jordil ..................... G01B 5/012 33/559
8,683,709 B2 * 4/2014 York ...................... G01B 5/008 33/503

(Continued)

FOREIGN PATENT DOCUMENTS

EP 0 392 660 A2 10/1990
EP 0 392 660 A3 2/1991
EP 1 666 833 A1 6/2006

*Primary Examiner* — George B Bennett
(74) *Attorney, Agent, or Firm* — Maschoff Brennan

(57) ABSTRACT

An articulating wrist for reorienting a measure probe relatively to a measuring apparatus, including a support element connectable to a positioning platform of a coordinate measuring machine, a first reorientable element pivotably connected to the support element for rotation about a first rotation axis, a first actuator, actuatable to cause the first reorientable element to turn about the first rotation axis, a first angle encoder configured to determine an angular position of the first reorientable element relative to the support element and to generate a time series of position values, characterized by a wrist controller receiving the time series of position values, determine in real time desired positions of the first reorientable element and command the first actuator to move towards the desired positions.

17 Claims, 3 Drawing Sheets

(56) References Cited

U.S. PATENT DOCUMENTS

| | | | | |
|---|---|---|---|---|
| 8,763,267 | B2 * | 7/2014 | Duportal | G01B 5/008 33/503 |
| 9,377,284 | B2 * | 6/2016 | McMurtry | G01B 7/012 |
| 9,759,540 | B2 * | 9/2017 | Ferrari | G01B 15/08 |
| 2022/0196387 | A1 * | 6/2022 | Ettelt | G01B 11/005 |
| 2025/0297846 | A1 * | 9/2025 | Sun | G01B 5/012 |
| 2025/0297856 | A1 * | 9/2025 | Eckardt | G01B 21/047 |

* cited by examiner

Fig. 4
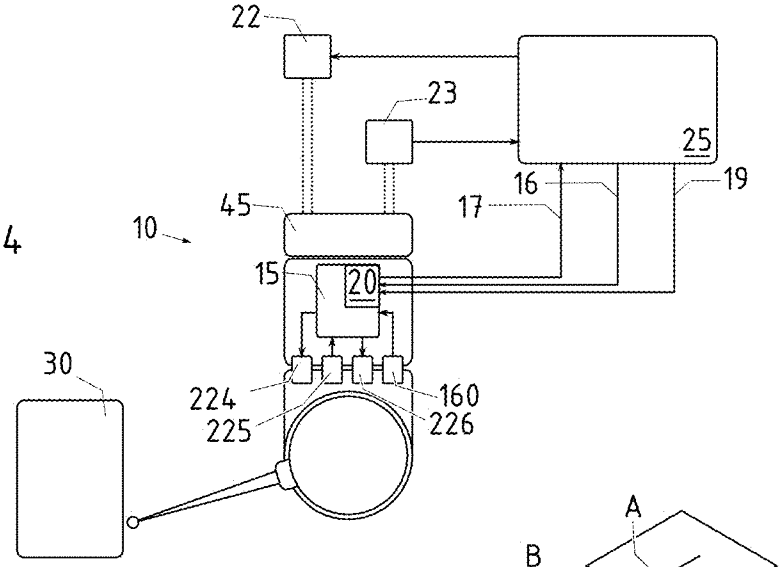
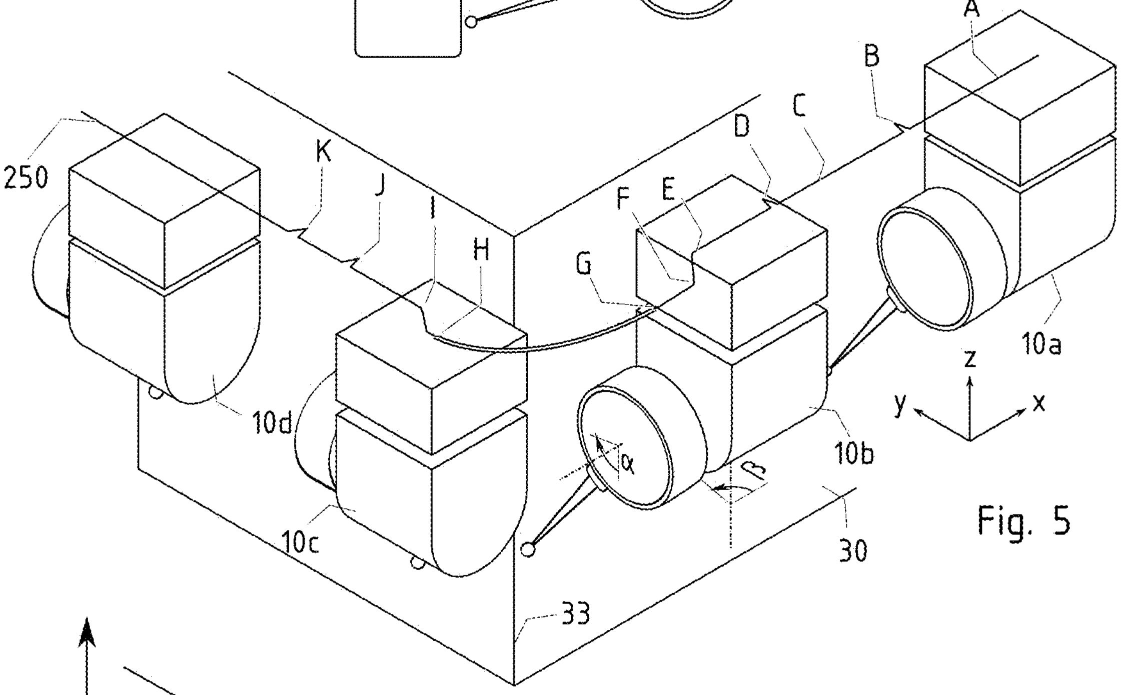
Fig. 5
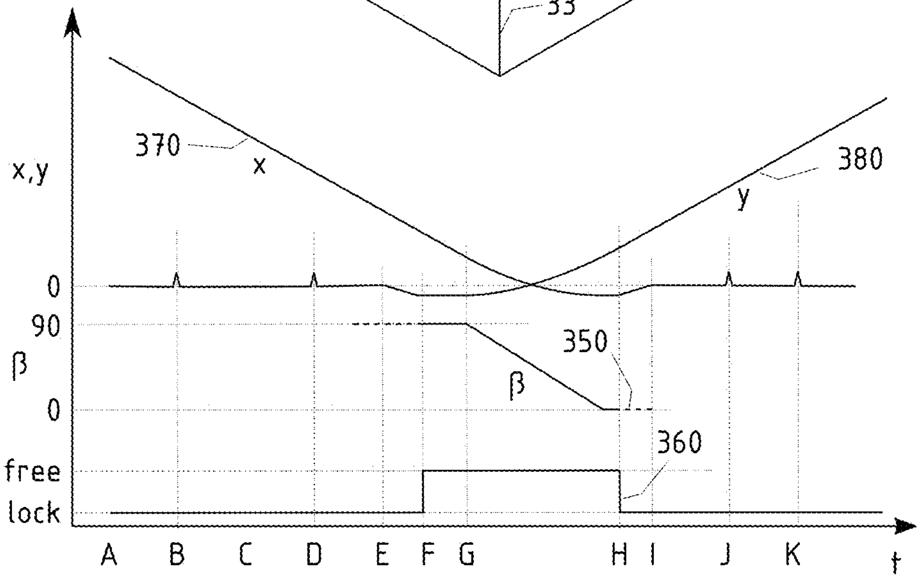
Fig. 6

ARTICULATED PROBE HEAD

REFERENCE DATA

The present application claims priority of European patent application 23197236.5 of 12 Sep. 2023, the full content whereof is hereby incorporated by reference.

TECHNICAL DOMAIN

The present disclosure concerns, in embodiments, a re-orientable measuring head for measuring three-dimensional coordinates of a mechanical parts and especially, but not exclusively, a re-orientable measuring head for use on a manual or automatic machine for measuring coordinates.

RELATED ART

Touch coordinate probes are used for checking dimension or surfaces of machined parts and to capture the three-dimensional shape of complex pieces, for example to reproduce or model them. Touch coordinate probes have, in general, a mobile feeler designed to be brought into contact with the surface of the piece under test. A sensor reacts to the slightest displacement of the feeler generating an electric signal that is sent either to the operator of a coordinate machine, or to an automatic controller of the same.

The sensor can be a trigger circuit, producing an electrical transition whenever a contact is detected, or a deflection transducer that yields a measure of the deflection, in one, two, or three coordinates. The touch coordinate probes equipped with a deflection transducer are also called scanning probes or analogue probes and can be used by programming the coordinate machine such that their feeler follows a continuous path of contact on the surface of the piece under test. Those of the former kind, more common, are called also trigger probes. They are often used to gather coordinates of a sparse set of points on the surface, and may be operated manually (for example by means of a handheld control interface such as a jog box or a pendant) as well as automatically.

Contactless coordinate probes are also known. They use a contactless sensor to determine the distance between, for example, a tip of the probe and the surface of the object under test without touching it. This category of sensors includes laser interferometric probes, chromatic confocal probes, ultrasound probes, cameras, line scanners and many others.

Usually, the coordinate probes are fixed on a movable platform whose position can be determined precisely. In known bridge-type coordinate machines, the mobile platform is part of a precise cartesian coordinate system and its position, relative to the machine's reference table, is read by linear encoders. In known wrist-type coordinate machines and industrial robots-which are sometimes equipped with coordinate probes for measurement purposes-positioning is achieved through a kinematic chain of rotation axis, in series. It is also known to use coordinate probes in mobile parts of machine tools, such as milling machines, lathes, and machining centres.

Coordinate machines can equip other tools different from coordinate probes, for example surface quality probes that measure a roughness of the surface, or imaging devices for inspection and control, but also for determining coordinates and dimensions. For the purposes of this disclosure, these tools are equivalent to coordinate probes and interchangeable therewith.

Coordinate probes can be fixed on the movable platform of the coordinate machine for measurements. Advantageously, coordinate probes can be attached to the moveable platform by means of a reorientable wrist (in this document also referred as an articulated wrist or an articulating wrist) providing various orientations of the coordinate probe. In fact, many measurements require changing the orientation of the coordinate probe to measure a workpiece completely and satisfactorily. When measuring features at the blind end of a hole, for example, being able to align the axis of the feeler with that of the hole is very useful. Many movable platforms do not offer this capability and coordinate probes are often mounted on a reorientable wrist with two independent rotational joints to overcome this lack.

Additionally, or as an alternative, it is possible to reorient the probe with respect to the piece under measurement with a rotary table under the workpiece. This can be operated automatically by the coordinate measurement machine as an additional rotational degree of freedom.

Rotation axes of reorientable wrists are often indexed, meaning that they can be locked in a large but finite number of predetermined positions that are highly repeatable, notably for taking accurate measurements in the μm range. This requires in general a locking mechanism having indexing elements or components, typically taking the form of a periodic joint, such as a Hirth coupling, or a crown of spherical surfaces on one side of the joint, coupling with three cylindrical rollers on the opposite side of the joint. In the locked state—also denoted as locked configuration in this disclosure—indexed axes are locked by pushing the two halves of the joint one against the other, while in the free status (or free configuration) they are freed by setting them apart with the locking mechanism. The rotation and the transition between the locked state and the free one can be manual or, preferably, motor driven. Documents EP 0392660 A1 and EP 1666833 A1 describe instruments of this kind. Indexation steps of 2.5°, 5°, 7.5° or 10° are common.

Known articulated wrist comprise a controller configured to drive the wrist's actuator to move the measure probe into a desired orientation. The desired orientation is transmitted to the wrist from the coordinate measuring machine during a measurement deadtime, in preparation for successive measurements. Upon reception of the desired orientation the wrist controller may acknowledge the new target configuration, unlock, if needed, the rotary joints, drive them to the new orientation, lock them, signal to the coordinate machine that the reorientation is complete and effective. Only after this last signal, the coordinate machine's controller moves the coordinate platform to gather new coordinates.

Wrist controllers can be located partially or completely inside a body of the wrist that is configured to protect the rotation and locking mechanism against dust and projection of liquids. In other realizations, it can be partially or completely separated from the wrist's body, e.g. in a separate protection case or be a subcomponent of the coordinate machine or of its controller.

In use, the articulated wrist and probe are utilized to measure complex pieces of mechanical equipment that require the acquisition of hundreds or thousands of points per unit. The coordinate machine follows a predetermined program determined in consideration of the nominal shape of the unit under test. The measuring program includes moving the positioning platform and rotating the axis of the wrist such that the probe can acquire all the needed points. At the same time, the program should-during measurement as well as during reorientation of the probe in dead times-avoid any collision between the movable parts of the articulated wrist and probe against the piece under test or against other components or accessories of the machine, for example supports of the workpiece or tool magazines. The planning of the measurement path must keep a sufficient safety distance between moving parts and fixed ones, considering uncertainties in the dimension of the piece and in the actual path of the tool.

Known articulated wrists are highly repeatable and can resist to considerable external torques when they are locked. When they are unlocked to turn and reorient the probe, a loose guiding of the rotors is preferable, because the additional constraints introduced by a tight guiding would reduce the positioning accuracy in the locked state. In contrast with scanning probe heads, operational position(s) of the measure probe attached to such wrist can be determined uniquely with a lower degree of accuracy in the free state, typically insufficient to provide accurate measurements, as the spatial relationship between the reorientable element with respect to the support element is affected by a mechanical incertitude, typically in μm- up to mm-range, until the rotors are locked again.

Moreover, the time required for moving from a given angle position to another is not precisely determinable in general, particularly when the rotation motors must fight against the weight and the inertia moment of a long probe attached to the wrist. In consequence, planning a safe trajectory combining translations of the XYZ platform and rotations of the wrist is not a trivial task. In many cases, the trajectory generators refrain from translating the platform and reorienting the probe at the same time but rather move the probe away from the piece to a safe place where it cannot hit anything, reorient it while the platform is stationary, then move it towards the workpiece and acquire a new set of coordinates in the new orientation. This lengthen and complicates the measurement path increasing downtimes between measurements.

Short Disclosure of the Invention

An aim of the present invention is the provision of an articulated wrist that overcomes the shortcomings and limitations of the state of the art.

According to the invention, these aims are attained by the object of the attached claims, and especially by an articulating wrist for reorienting a measure probe relatively to a measuring apparatus, including: a support element connectable to a positioning platform of a measuring apparatus, a first reorientable element pivotably connected to the support element for rotation about a first rotation axis a first actuator, actuatable by a wrist controller for rotating the first reorientable element about the first rotation axis, a first angle encoder configured to determine an angular position of the first reorientable element relative to the support element and to generate a read orientation, a communication interface configured to receive digital commands and data, the articulating wrist being configured to operate selectively in either of: a locked mode, in which the first reorientable element is mechanically constrained in one of a finite set of indexed orientations, a free mode, in which the first actuator can turn the first reorientable element, characterized in that: the wrist controller is configured to receive, through the communication interface, positioning command conveying a series of desired orientations of the first reorientable element and specified times to attain the desired orientations, and, while the articulated wrist operates in the free mode, to read the first position, select each of the desired orientations in a time-ordered succession and command the first actuator to move towards the selected desired orientation at the corresponding specified time based on a difference between the read orientation and the selected desired orientation. Advantageously, the wrist controller can be configured not only to command the actuator but also to receive such positioning commands, uniquely when the articulated wrist is in the free mode.

The positioning command can signal the specified times explicitly (e.g. by conveying an indication of time at which the desired position should be attained) or implicitly (in this document also referred as "instantaneous configuration", e.g. the desired orientation has to be attained in a given short time interval from the reception of the command, preferably shorter or equal to 100 ms, most preferably lower or equal to 10 ms or 1 ms).

Preferably, the communication interface is configured to retransmit successive values of the read orientation to a controller of the measuring apparatus.

The first actuator may be integrated in the first reorientable element and is preferably capable of unbound rotation, thanks to a slip ring in the support element that is arranged to transmit the required power and signals, and fluids if required, between the support element and the first reorientable element. The signals may include optical signals, for example for an optical measuring probe.

Indexing in the locked configuration can be achieved by an indexed coupling between the support element and the first reorientable element, the indexed coupling has a plurality of mobile positioning elements united with the first reorientable element as well as a plurality of fixed positioning element united with the support element. The latter can engage with the former to define a plurality of predetermined indexed orientations. A locking actuator controlled by the wrist controller, sets the wrist in the free state or in the locked state. In the free state there is axial separation between the mobile positioning elements and the fixed positioning elements, whereby the first reorientable element can be turned by the first actuator. In the locked one the mobile positioning elements and the fixed position elements are mutually engaged and the first reorientable element assumes one of the indexed orientations with no rotation possible. Remarkably, when the wrist is in the free mode, it can be controlled to reorient the probe at the same time as it is translated by the positioning platform of the measuring apparatus, but the probe is used to measure coordinates only in the locked mode, with enhanced precision. Preferably, the locking actuator comprising a hollow body or rod configured to bias the mobile positioning elements against the fixed positioning elements in the locked mode and to separate the mobile positioning elements from the fixed positioning elements in the free mode, the hollow body allows a passage for electric and/or optical and/or fluid conductors between the support and the first reorientable element.

The wrist controller can be configured to switch between the locked state and the free state and conversely in response to commands received through the communication interface. In addition to the advanced mode in which it is constantly controlled from outside, the articulating wrist may have a selectable legacy mode in which it can change the orientation autonomously the upon reception of a desired final orientation through the communication interface. In this mode, the wrist controller sets the wrist in the free state, command the actuator to rotate the first reorientable element until the final orientation is reached, sets the wrist in the locked state, optionally sends an acknowledgement message through the communication interface. In addition to the elements disclosed above, the articulating wrist may have additional sensors, for example one or more of: temperature sensor, humidity sensor, acceleration sensor, gyroscope sensor, luminosity sensor, motor current sensor, capacitive crash sensor.

To reach a more complete set of orientations, the articulating wrist may have a second reorientable element pivotably connected to the first one for rotation about a second rotation axis, essentially orthogonal to the first axis. This second element may be turned about the second rotation axis by a second actuator in the first reorientable element and may have a connector for the measuring probe. A second angle encoder captures the angular position of the second reorientable element relative to the first one and provides a second read orientation that is used together with the first one. In this two-axis realization of the wrist, the positioning command may specify a series of desired orientations with two parameters: a first angle of the first reorientable element relative to the support element and a second angle of the second reorientable elements relative to the first reorientable elements. The wrist controller reads the actual values of the angles from the encoders, select each of the desired orientations in a time-ordered succession and command the first actuator and the second actuator to move towards the selected desired orientations at the corresponding specified time based on differences between the read angles and the desired ones.

In an important use case, the measuring apparatus consists in a coordinate measuring machine equipped with the articulated wrist, but the wrist could be used also in machine tools and robots. All the possible geometries of measuring machine (bridge, gantry, cantilever, articulated arm, . . . ) are possible.

In such use case, the measuring apparatus can comprise a mobile positioning platform on which the articulated wrist can be attached, the platform being controlled by an apparatus controller of the measuring apparatus, while a measure probe can be connected to the articulating wrist for measuring a workpiece with the measuring apparatus. Advantageously, the apparatus controller can be configured to: determine a planned trajectory comprising a series of instantaneous configurations, each configuration determining a position of the mobile positioning platform and an orientation of the articulated wrist carrying the measure probe, control the positioning platform so as to translate the positioning platform following the succession of positions defined in the planned trajectory in a time-ordered fashion, and to send commands to the wrist controller such that at the same time as the positioning platform is translated, the measure probe is rotated by the articulated wrist following the succession of orientations defined in the planned trajectory synchronously with the corresponding translations of the positioning platform. Advantageously, the apparatus controller can be further configured to send commands to the wrist controller such that the wrist controller selects the free state of the wrist in preparation of a change of wrist orientation or the locked state of the wrist in preparation to a measurement with the measure probe. Preferably, the apparatus controller can be configured to periodically transmit commands to the wrist controller to provide an instantaneous configuration, preferably regularly with a period equal or lower than 100 ms, preferably equal or lower than 10 ms, more preferably equal to 1 ms.

Advantageously, the apparatus controller can be configured to determine the planned trajectory based on features and/or capabilities and/or performances of the attached articulated wrist and/or of the carried measure probe and/or of accessories thereof.

The invention relates also to a method of operating a measuring apparatus having a mobile positioning platform controlled by an apparatus controller, the articulating wrist of any one of the preceding claims attached to the mobile platform, a measure probe connected to the articulating wrist for measuring a workpiece with the measuring apparatus, the method comprising: determining a planned trajectory comprising a series of instantaneous configurations, each configuration determining a position of the mobile positioning platform and an orientation of the wrist carrying the measure probe, controlling of the positioning platform by the apparatus controller so as to translate the positioning platform following the succession of positions defined in the planned trajectory in a time-ordered fashion, sending commands from the apparatus controller to the wrist controller such that at the same time as the positioning platform is translated, the measure probe is rotated by the wrist following the succession of orientations defined in the planned trajectory synchronously with the corresponding translations of the positioning platform. The method may include sending commands from the apparatus controller to the wrist controller such that the wrist controller selects the free state of the wrist in preparation of a change of wrist orientation or the locked state of the wrist in preparation to a measurement with the measure probe. Preferably, the instantaneous configurations are transmitted by the apparatus controller to the wrist controller periodically with a period lower than 100 ms, preferably lower than 10 ms more preferably equal to 1 ms. The measuring apparatus may be a coordinate measuring machine of any kind, a machine tool, a robot etc.

The successive values of the read orientation sent from the wrist controller to the apparatus controller may be used to determine an actual configuration of the measuring apparatus based on the values of the read orientation and on a read position of the positioning platform determined through position encoders of the measuring apparatus, a difference between the actual configuration and a desired instantaneous configuration of the planned trajectory, and finally to send instruction to the wrist controller and/or to actuators of the measuring apparatus moving the positioning platform instructions tending to bring the difference to zero.

In one embodiment, the method also comprises: collecting features and/or capabilities and/or performances of the attached articulated wrist and/or of the carried measure probe and/or of accessories thereof apparatus; and determining the planned trajectory based on collected features and/or capabilities and/or performances.

An independent aspect of the invention may be an articulating wrist including environmental and operational sensors, including for example temperature sensors, humidity sensors, acceleration and/or gyroscopic sensors, light sensor, current motor sensors, and case opening sensors. Preferably, the articulating wrist is configured to transmit information collected by the environmental and operational sensor to a machine controller or to another external device, through a suitable digital communication interface.

The data collected by the environmental and operational sensors can be used to any purpose including improving the precision and the accuracy of the metrological data, for example by applying temperature compensation procedures, to detect crashes, to determine a health status of the wrist and preventive maintenance, for detecting unauthorised opening and tampering, and for warranty purposes. The environmental sensors are preferably positioned in each of the three segments of the wrist (support element, first and second reorientable element).

The exchanges with the machine controller and with the external device may involve a unique identifier of the wrist that is stored in a non-modifiable memory in the wrist, and/or a service identifier that allow a rapid identification of the wrist as well as (preferably) of the connected probe, and the data maybe timestamped for integrity and ease of use, either by the wrist, if a RTC is available, or by the receiving device.

Preferably, some environmental sensor, such as the light sensors, the humidity sensors, the accelerometers/gyroscopes are configured for autonomous operation on an autonomous supply source when the wrist is disassembled, can store the environmental data internally and transmit them to the machine controller or another designated receiver at a successive power-on.

The wrist equipped with environmental and operational sensor may include also all the features of the wrists with angle encoders mentioned before, and conversely, the wrist with angle encoders may also have environmental and operational sensors in all the variants and combinations disclosed in this document.

In the framework of the present disclosure the word "probe" denotes any device used to inspect a workpiece or measure a metrology related quantity, for example coordinates of selected points on a surface of the workpiece, coordinates along a path on a surface of the workpiece, a surface state, roughness, and so on. The term includes both contact-based and contactless devices, and automatic imaging systems.

In the framework of the present disclosure, the word "wrist" (and the equivalent wordings "articulated wrist" and "reorientable wrist") denotes a device designed to be affixed on a measuring apparatus (e.g. coordinate measuring machine) and provide a re-orientation of an attached probe relatively to the measuring apparatus—from a first orientation (e.g. angular position) to a second one—around at least one rotational axis between successive measurements.

In the framework of the present disclosure, "slip ring" denotes any device that allows the transmission of electric power and/or electrical or optical signals, and fluids if required, between a stationary and a rotating structure. This may include graphite or metal brushes which rubs on a (relatively) rotating collector, but also magnetic devices, such as rotary transformers. Optical slip rings allow the transmission of optical signals, with or without contact, uni- or bidirectionally, between a stationary part and a rotating one. Slip rings can have one or several conductors or channels to transmit as many signals or power lines as needed.

The expression "time series" denotes, in the present disclosure, any series or sequence of data values indexed in time order, e.g. data values in order of occurrence. "real time" denotes a process in which events and measurement are processed in a short time after they occur, for example lower than 100 ms, preferably equal or lower than 10 ms, more preferably equal or less than 1 ms.

The present disclosure shows examples of the invention that have two rotational joints and two corresponding rotation axis "A" and "B", because this is a common configuration, but this is not essential. The invention includes variants with one single joint, for example the sole axes "B", or three or more rotational joints. These variants are not disclosed in detail for brevity.

The above-described articulating wrist enables precise and efficient reorientation of a measuring probe in one or two degrees of freedom, thereby improving the accuracy and speed of the measuring process. By including a second reorientable element and a second actuator, the wrist can perform more complex movements and reach a wider range of positions, enhancing its versatility and usability. The wrist controller ensures that the reorientation is carried out with maximum accuracy and speed, reducing measurement errors, and saving time. With respect to what is known in the art, the invention provides the advantage that the change of orientation can be performed synchronously with the movement of the positioning platform, reducing the dead times of the coordinate machine. And leading to a higher measurement throughput.

Moreover, the invention allows selective reorientation and repositioning of the measuring probe along the defined trajectory at one of different possible speeds, the speed being selected depending on one or more environmental and/or operational variables being estimated, determined and/or sensed-, such as:

- a local concentration of objects near the articulated probe head and/or the measure probe;
- a load affecting the articulated probe head and/or the measuring machine;
- a size of the articulated probe head and/or of the measure probe;
- an environmental factor degrading movements and/or orientation accuracy of the measure probe.

Exemplarily, the machine controller can operate in a safe operational mode where the reorientation and the repositioning of the probe is conducted slower, notably for allowing operations within the operational volume of the machine managed by an operator, or so as the trajectory can be followed in a more accurate way than in a normal mode where the reorientation and the repositioning of the probe is executed more rapidly.

Another advantage of the inventive wrist is that the rotations about one axis, for example the vertical "B" axis is not limited to a bounded sector, for example (−180°, +180°) or to a finite number of revolutions. When a reorientable wrist is moved in a continuous way and at the same time translated around a workpiece, it is sometimes necessary to turn the wrist by a large angle for a small change in orientation, to avoid a physical limit of the joint. The rotation angle of the "B" axis of the wrist of the invention is unbound, and this shortcoming is avoider. This feature not only makes the measurement path planification simpler but also increase the machine's measurement throughput. Unbounded rotation about both "A" and "B" axis is possible as well.

SHORT DESCRIPTION OF THE DRAWINGS

Exemplar embodiments of the invention are disclosed in the description and illustrated by the drawings in which.

Figure 3A:
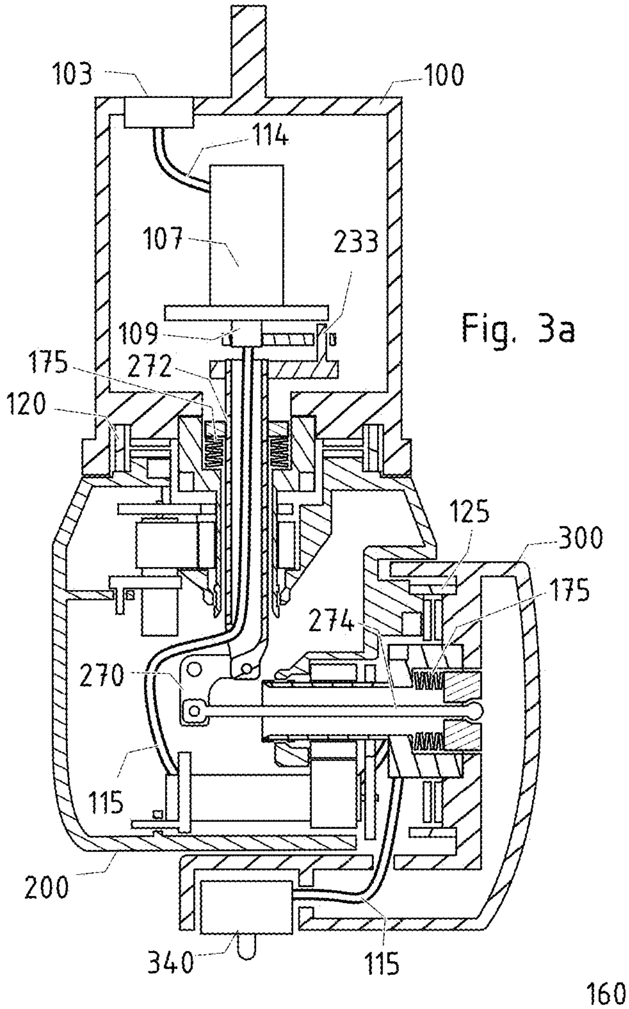
Figure 3B:
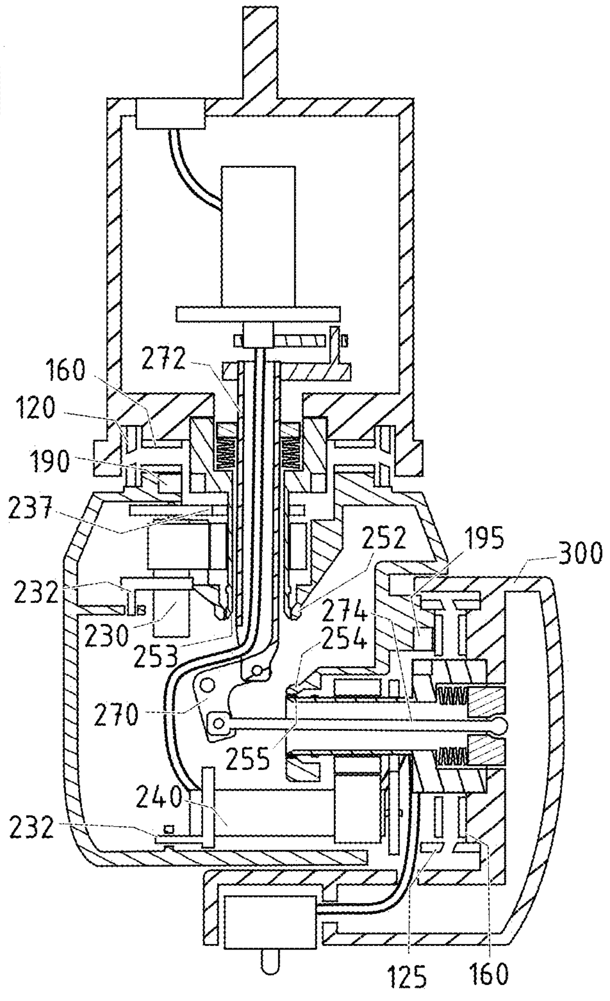

FIGS. 3*a* and 3*b* show, in simplified fashion, the reorientable wrist of the invention in a locked state, respectively in a free one.

FIG. 4 represents, in a simplified schematic fashion, the reorientable wrist in relation with its wrist controller and with the coordinate machine controller.

FIG. 5 is an example of a trajectory chosen by the coordinate measuring machine equipped with the articulated wrist of the invention.

FIG. 6 is a plot of the control signals received by the articulated wrist during the trajectory of FIG. 5.

In the figures, remarkable elements are identified by reference signs that are repeated in the text. The same reference sign may be used to identify distinct elements that are identical, similar, or technically equivalent. When many identical, similar, or equivalent elements are present in a figure, some reference signs may have been omitted to avoid overcrowding the drawing.

Examples of Embodiments of the Present Invention

Figure 1:
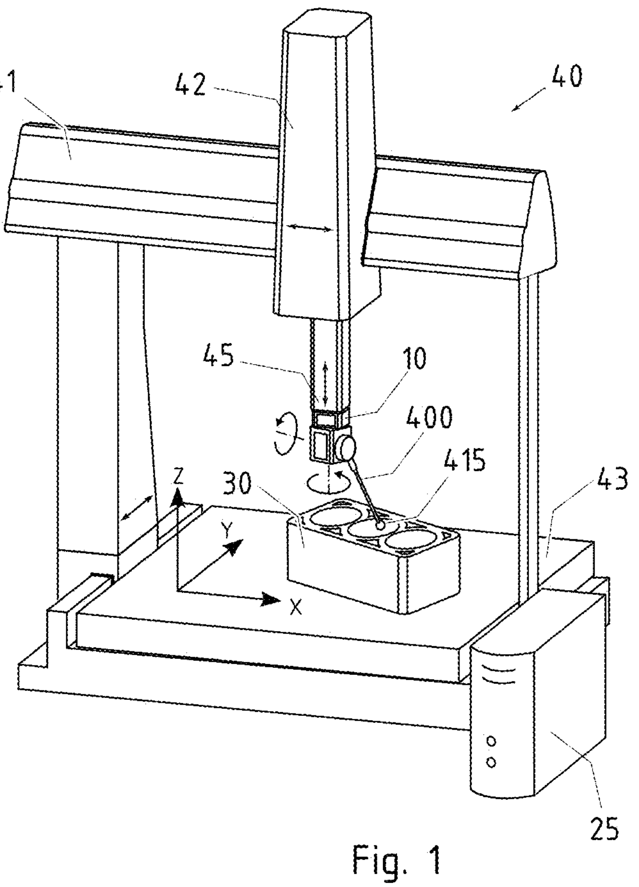
FIG. 1 shows schematically a coordinate measuring machine with the automatic reorientable wrist of the invention measuring a workpiece under the supervision of a digital controller.

FIG. 1 shows a coordinate-measuring system including a coordinate measuring machine 40 of a known type. The coordinate measuring machine 40 has a horizontal table 43 on which the workpiece 30 that is measured rests. The bridge 41 moves along one first linear axis (Y) on the table 43, and the carriage 42 moves along a second linear axis (X) orthogonal to the first one. The vertical spindle 45 (also called quill or Z-ram, according to different conventions) moves on a third orthogonal axis (Z), such that the end extremity of the spindle 45 is a positioning platform that can be positioned at any desired point in the measuring volume of the machine (i.e., in the volume where the CMM is able to provide a measure of a surface of an object). Suitable encoders (not represented) read the positions of the bridge 41, carriage 42 and spindle 45 along the measuring axes X, Y, Z. Most CMM machines are automatic and the motion of bridge 41, carriage 42 and spindle 45 is determined by electric motors, but manual machines exist. A machine controller 25 is programmed to command the motors according to a predefined measuring plan that is designed in consideration of the shape of the workpiece 30.

FIG. 1 shows a touch probe 400 that has a spherical tip 415 designed to touch the workpiece 30 at the desired points. The touch probe 400 is often a trigger probe, configured to generate an electric signal on contact. This signal is used by the controller 25 to store the instantaneous values of X, Y and Z, and compute the corresponding coordinates of the contact point, by known methods.

The trigger probe 400 could be replaced by another kind of coordinate probe, for example an optical non contacting probe, a scanning probe, a "hard" probe and so on, without leaving the scope of the invention. The shape and length of the stylus is not limited, either.

The bridge structure of FIG. 1, while common, is not the only possible. The invention is not limited to this execution but includes all the variety of shapes and structures found in coordinate measuring systems. The invention explicitly comprises systems in which the carriage slides along a horizontal beam that is cantilevered, rather supported at both ends, articulated arm machines exclusively based on rotational degrees of freedom instead of linear ones such as articulated-arm coordinate machines and robots, parallel robots such as delta robots and Stewart platforms, and so on.

The size of the machine can also vary, from benchtop machines to large devices used to measure vehicles, aircrafts or turbines, without departing from the scope of the invention. The articulated probe head can be mounted vertically or horizontally on the positioning platform of the system. The invention explicitly comprises systems comprising moveable tables, e.g., rotary table, for movably supporting the workpiece during operations (e.g. measurements).

Precision and accuracy in CMM range from sub-micron accuracy in laboratory equipment to maybe 10-100 μm in some industrial application. The invention is applicable to all the variants disclosed herein and, in general, to any kind of mobile platform that can be moved with suitable repeatability and precision.

Figure 2:
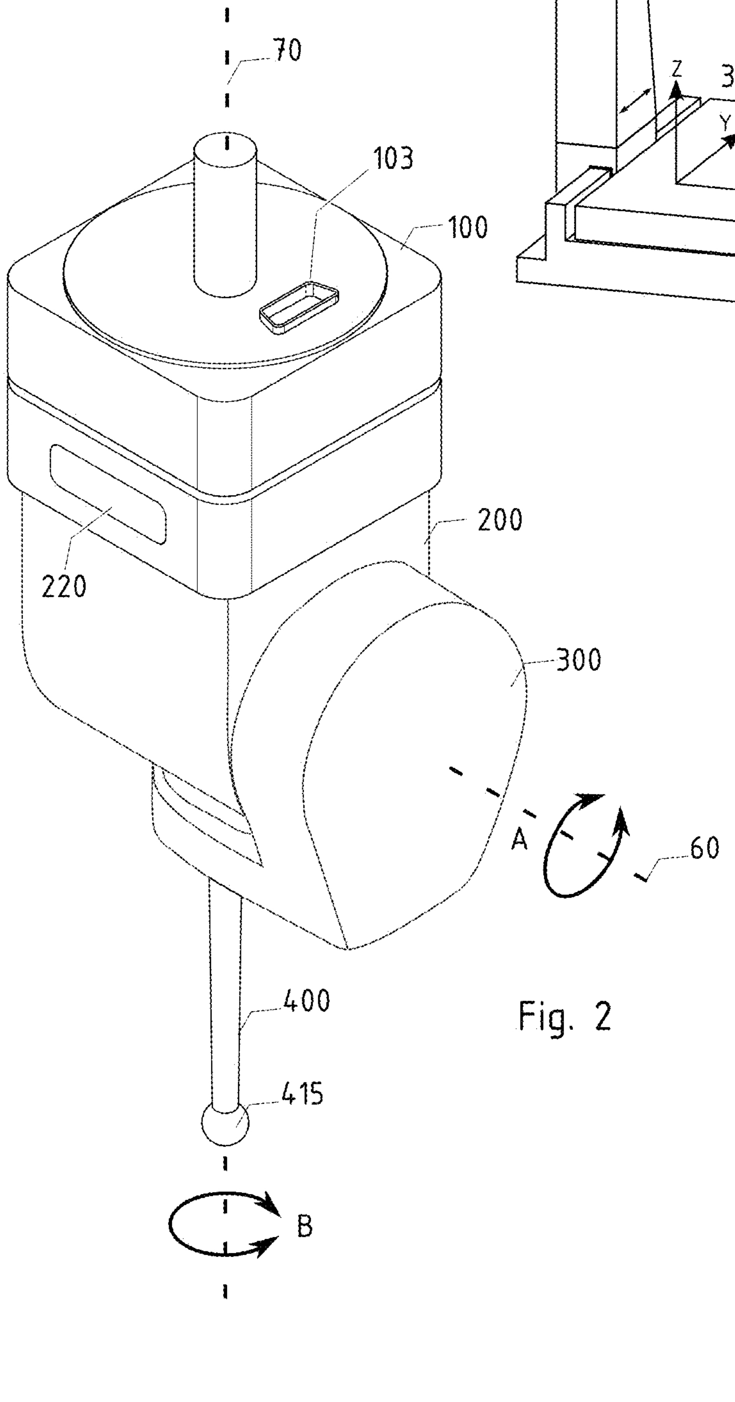
FIG. 2 shows schematically a reorientable wrist as used in the present invention.

FIG. 2 shows the general structure of an articulated wrist as used in the present invention in combination with a generic coordinate measuring machine. The wrist includes a support element 100 that is configured to be affixed on a positioning platform of a coordinate measuring machine. In many implementations, which include the cartesian coordinate machines, the support element 100 will be translated by the coordinate machine along a desired trajectory without rotation, and the articulated wrist is used to reorient the measure probe according to the needs, for example to insert the probe in a bore, or between the aerodynamic vanes of a turbine. In other cases, the motion of the positioning platform to which the wrist is affixed may include rotations, and in these cases the wrist may be used to compensate for them. The connection between the wrist and the positioning platform can be obtained in any suitable way.

Importantly, the wrist has a connector 103 to power and control the internal actuators that are responsible for reorienting the probe, and for powering and reading the coordinate probe itself. In the simple case in which the coordinate probe is a touch trigger probe, the only connection that is needed is a current loop that is opened as soon the probe touches the workpiece, but more sophisticated powering and signalling schemas can be used. the connector 103 may include also optical fibre connections, for example in combination with an optical probe, measuring the distance to a workpiece by interferometry, triangulation, time of flight, chromaticity, focus variation, or in any other suitable manner. This does not imply that the connector 103 is essential, though. The inventive wrist could possibly dispose of the connector 103 entirely using a battery and some form of wireless data transmission, for example. The connector 103 may include optical channels, or else the wrist may have an additional connector for optical signals. In alternative, an optical probe equipped on the wrist may be connected to a dedicated measuring apparatus by an optical fibre bypassing the wrist.

The support element 100 is pivotably connected with a first reorientable element that can turn relative to the support element about axis "B". The axis "B" is drawn vertically in the figure, and this is its conventional orientation; therefore, it may be also called a "vertical rotation axis", although the wrist can be used in any orientation in space.

The angle of rotation about the axis "B" is adjustable by internal actuators in the wrist and is controlled by digital signals, as it will be explained in the following. Importantly, the axis is of the indexed variety, meaning that, besides a "free" status, in which the reorientable element can turn about axis "B", the wrist has also a locked status, in which the relative position of the first rotor 200 relative to the support element is determined by an internal periodic joint. In the locked status, the rotor is immobile in one of a predetermined plurality of precise and repeatable angles relative to the support 100.

Preferably, the wrist comprises also a second reorientable element 300 that is pivotably attached to the first one. The second reorientable element 300 is capable of being turned about a second axis "A" that is preferably orthogonal to the first axis "B" and is therefore conventionally horizontal. As in the case of the other axis, the rotation of the second reorientable element 300 is preferably indexed.

The coordinate probe 400 is attached to the second reorientable element, when present. The drawing shows a touch probe that yields a contact signal whenever the sphere 415 touches the workpiece, or a deflection signal when the sphere, sliding on the surface of the workpiece, is moved away from its rest position. The wrist could be equipped with any kind of coordinate probe, either contact-based or contactless, or with other probes, such as a surface quality probe or a camera.

Through the serial composition of the rotation angles about the axis "B" and "A", the probe 400 can be aligned with any desired direction in space. Preferably, the rotation about the axis "B" spans more than one revolution, and even more preferably it is unbound. The rotation of the second reorientable element about the axis "A" may have a forbidden sector upwards, which matters little when the wrist is attached below a positioning platform, as it is usual.

Optionally, the reorientable wrist may have one (or more) visual indicator(s) 220, that can be activated by a controller of the coordinate machine or autonomously, by a wrist controller circuit. This may be used to signal a contact of the touch probe 415, for example. Complementarily or alternatively, the visual indicator 220 can be activated by a controller of the wrist, for example an operational configuration of the wrist (e.g.) and/or an operational status or configuration of the wrist and/or a sensed environmental factor (e.g. a locked or a free configuration of the wrist, below/upper than a given humidity or temperature level, operational abnormality of an active component of the wrist such as an actuator FIGS. 3*a* and 3*b* show the reorientable wrist partially sectioned. The drawings are simplified: only the important elements are represented, and that in a schematic idealized way. FIG. 3*a* shows the probe in the locked, indexed state, and FIG. 3*b* shows the probe in the free, rotation-capable state. In this embodiment, both axes "A" and "B" are locked or freed together. This is not an essential feature. Variants where the axis "A" and "B" can be freed, locked and/or operated independently from one another could be devised, should this be advantageous in specific use cases.

The signals and power levels coming from and going towards the connector 103 are routed to a slip ring device 107 that is inside the support element 100. The body of the slip ring capsule 107 does not rotate and is connected to the connector with a short upper cable harness 114. The axle 109 of the slip ring follows the rotation of the first orientable element thanks to an anti-rotation finger 233 and is the origin of a wire harness 115 that enters the first reorientable element 200 as well as the second reorientable element 300 to provide the needed energy and signal paths. In the drawings the harness 115 is drawn without ramifications and goes directly to the probe connector 340, but this is a simplification of the real configuration.

The operation of the reorientable wrist is controlled by an electronic wrist controller, not drawn to avoid cluttering the figures. The wrist controller may include one or more circuit boards in the support 100, and/or in the first reorientable element 200 and/or in the second reorientable element 300. The wrist controller receives power and commands through the wire harness 115, commands the motors that determine the rotation of the reorientable elements, reads the actuators that measure the corresponding rotation angles, and switches between the locked state and the free rotation-capable one, as it will be disclosed in the following. In a possible variant, the wrist controller could be separated from the reorientable wrist rather than embedded and communicate with the actuators and sensors in the wrist through the wire harness and the connector 103. The wrist controller may also consist in a set of intercommunicating electronic modules, partly embedded in the wrist, partly external.

The slip ring capsule 107 will be equipped with enough conductive circuits as needed to carry all the power and signal lines needed for the present application, for example 12 or more rings. Where needed, the slip ring capsule 107 could also include a pneumatic slip ring to transmit fluids liked compressed air, and/or optical circuits to transmit optical signals. Suitable electric and electro-optical slip ring capsules can be obtained by the companies Moflon Co. of Shenzen, China, Moog Inc. of Elma, New York, and many other.

Advantageously, the slip ring device 107 is located inside the support element 100 and the dimensions of the latter are chosen to enter, at least in part, inside the Z-spindle of the coordinate measuring machine, which is hollow. In fact, the articulated wrist can be advantageously designed and destined to be mount on a mobile platform having a central cavity, such as most of the Z-spindle of the coordinate machines. In such configuration, the articulated wrist can be advantageously designed for entirely or at least partially accommodating the support element 100 inside this void and unused cavity. The fixation to the mobile platform can be enabled by a dedicated interface enveloping the shape of the Z-spindle, alternatively by a dedicated fixing mechanism operating on Z-spindle portions such as walls and/or sides. In this manner, the assembly is more compact, and the height of the measurable volume is not reduced.

The harness 115 enters the first reorientable element through the central bore of a hollow rod 272 that is linked to the crank 270 and serves to lock and free the first reorientable element 200. In the locked state, the position of the first reorientable element 200 relative to the support 100 is defined by a periodic coupling 120, which may be a Hirth coupling, or any other similar device. The angle resolution of the Hirth coupling may be, for example, 144 positions equally spaced by 2.5°, or any other desired combination. The mating surfaces of the Hirth coupling are biased one against the other by the rod 272 that is held in tension by the crank 270, with a contact force determined by the compression spring 175.

This synergy between the locking mechanism and the mechanism providing unbound rotation, i.e. a passage through a cavity or recess of the locking actuator 272 for the optical signals and/or power and/or the electric cables 115 between the support element and the first reorientable element, allows a more compact and robust design of the articulated wrist.

The position of the second reorientable element 300 relative to the first one is defined, in the locked state, by a similar arrangement as that of the first reorientable element 200. The second periodic coupling 125 may be a second Hirth coupling with the same resolution as the first one, or a different device, according to the needs. The pull rod 274 that is linked to the crank 270 biases the mating surfaces of the periodic coupling one against the other at the same time when those of the first periodic coupling 120 are biased by the hollow rod 272.

Since the rotation of the second reorientable element is bounded, the harness 270 is threaded in the second reorientable element, allowing a sufficient length to permit the rotation of the second reorientable element 300 in the intended range. A second slip ring device (with optical and electrical circuits, if needed) and hollow rod could be provided to allow infinite rotation about the "A" axis, however. The harness reaches the connector 340 at the distal end of the second reorientable element, to which an interchangeable probe can be connected.

FIG. 3*b* shows the wrist in the unlocked state. The unlocking is determined by the rotation of the crank 270 by a non-represented actuator, for example a brushed DC motor with a suitable reduction. In the unlocked state, the rods 272, 274 push the first reorientable element 200 away from the support 100, respectively the second reorientable element 300 away from the first reorientable element 200. The mating surfaces of the first Hirth coupling 120 and of the second Hirth coupling 125 are separated, and the rotation is possible.

The first reorientable element 200 is guided in his rotation about the "B" axis by a bearing including an outer sleeve 252 and an inner axle 253 that can pivot and slide axially in the sleeve, to accommodate both the rotation and the transition between the locked state and the free one. Remarkably, the bearing surfaces are profiled such that the minimum distance between the axle and the sleeve is larger in the locked state than in the free state. Thanks to this feature, the rotation of the reorientable element 200 is guided with adequate precision but, when the wrist is locked, the bearing does not introduce any side force or torque that could alter the indexing given by the periodic coupling 120.

When the wrist is in the unlocked configuration, the spatial relationship between the first reorientable element 200 with respect to the support element 100 is determined by the bearing surfaces that guarantee a mechanical (radial and axial) position error typically in several μm- up to mm-range. Thus, in contrast with scanning probe heads, the uncertainties on geometric configuration of the wrist and on the position of the measure probe prevent accurate measurements of coordinates (for example in μm-range.

The rotation about the "B" axis is produced by the electric motor 230 through a pair of gears 237. The electric motor 230, which may be a brushed DC motor, is mounted on a collar that can turn freely around the sleeve 252—which is connected to the support element 100 and does not turn—and drives the body of the first reorientable element 200 through the anti-rotation pin 232. Importantly, the pin can slide axially in the corresponding hole to allow the transition between free and locked states, and the coupling of the pin in the hole is rather loose to avoid any influence on the indexed positions.

The second reorientable element rotates about the "A" axis through a similar arrangement comprising a bearing including the axle 255 and the sleeve 254, the motor 240, the pin 242.

The articulated wrist of the invention also includes a capacitive sensor 160 that responds to the average distance between the support element 100 and the first reorientable element 200. The capacitive sensor can be used to ensure that the indexed coupling surfaces 120 are fully separated before starting a rotation, and to detect unwanted collisions of the wrist or of the probe during the motion of the wrist. Preferably, the capacitive sensor 160 is active both in the free state and in the locked one. A similar capacitive sensor 160 provides the same function for the "A" axis between the first reorientable element 200 and the second reorientable element 300.

A rotary encoder 190 provides the relative angular position between the support element 100 and the first reorientable element 200. The rotary encoder 190 could make use of a resistive transducer, an optical encoder, an inductive encoder, a magnetic or magnetoresistive encoder, or any other suitable angle-measuring device. Preferably, the angle transducer 190 is an absolute encoder. The angle transducer 190 is used to control the instantaneous rotation in the free state, as it will be explained in the following, but it may be active optionally also in the locked state. There is a corresponding angle transducer 195 to sense the rotation of the second reorientable element 300 relative to the first reorientable element as well.

FIG. 4 shows schematically a reorientable wrist 10 mounted on a movable platform 20 in contact relation with a workpiece 30. The platform can be translated at will inside a predetermined measure space by the machine controller 25 that drives suitable actuators 22. In the common case of a bridge-type CMM, the actuators 22 would be three motors producing three linear movements each along one of the three cartesian directions X, Y, Z, but other configurations are possible. The machine controller 25 receives also positional data from position encoders 23 that provide the instantaneous position of the positioning platform at any given time. Referring again to a conventional bridge-type CMM, the encoders 23 may be embodied by optical linear transducers that measure the extent of the three linear movements mentioned above and provide the position of positioning platform as a 3D vector of values X, Y, Z.

The reorientable wrist 10 is managed by an electronic wrist controller 15 that can be embedded in the wrist itself, preferably, or provided as a separate unit. The wrist controller can be in form of HW and/or SW, e.g. comprise one or more dedicated electronic circuits and/or be enabled by one or more sets of instructions by running by a computer hardware (e.g. a microprocessor, microcomputer, Digital Signal Processor, or programmable electronic unit) being part of the wrist and/or of the coordinate machine, the instructions being preferably stored in a non-volatile memory of the wrist or of the machine.

As shown in FIG. 4, the wrist controller 15 operates the motors 224 producing the rotation of the reorientable elements of the wrist, and the actuator 226 that locks and unlocks the wrist, reads the angle encoders 225 of axis "A" and "B", and the capacitive crash sensors 160. The wrist controller 15 can be programmed to transmit the instantaneous internal state of the wrist to the machine controller 25 (arrow 17) and to receive from the machine controller the desired values of the angle parameters and of the lock status (arrows 16, 19).

The wrist controller 15 can thus comprise a data transmission interface 20 for transmitting the instantaneous internal state 16 to the machine controller 25 and/or for receiving the desired values of configuration from the machine controller 25. The data transmission interface can be configured to transmit and/or to receive data according to a—wire-based or wireless-communication standard, advantageously a digital and industrial one, such as an Ethernet-based fieldbus, eventually relying on signal and/or powering cables 114 and/or on dedicated cable(s) passing through the connector 103 or trough another bus connector.

The internal state of the wrist may include the joint parameters, notably the angular positions of the first and second reorientable elements, the lock/free state, a touch flag, indicating whether the touch probe is in contact with the workpiece 30, or a distance between the probe and the piece, a crash flag generated by the capacitive sensors 160 and any other state variable, digitally encoded.

The internal state transmitted to the machine controller may be completed by values acquired by various sensing elements in the wrist, for example:

- temperature sensors for collecting temperatures of selected portions of the wrist. These temperatures data may be used in the machine controller for thermal compensation of measurements or for diagnosing the health of the wrist. Preferably, each of the three segments of the wrist (support element, first and second reorientable element) has at least one temperature sensor.

humidity sensor or sensors for collecting humidity values of selected portions of the wrist. These data may be used to determine tampering and/or assessing the validity of the warranty, for example.

acceleration and/or gyroscopic sensors for detecting shocks and/or collisions involving the wrist. Advantageous one sensor of this nature is provided in each segment of the wrist or at least in each of the reorientable elements.

light sensors for detecting tampering and confirm maintenance operations. A light sensor may usefully be located inside the first reorientable element 200, which is normally closed. Detection of light above a stated threshold may be used to determine whether the wrist has been tampered with, serviced or modified without authorisation.

motor current sensing for determining an operational status and for predictive maintenance.

The sensed and usage data are sent to the CMM controller 25 and, especially data relatives to misuses and licensing, to an external device by a suitable communication module (not represented). The exchanges with the machine controller 25 and with the external device may involve a unique identifier of the wrist that is stored in a non-modifiable memory in the wrist, and/or a service identifier that allow a rapid identification of the wrist as well as (preferably) of the connected probe.

To ensure data integrity and simplify further data use, the wrist controller 15 may include a real-time clock module that is used to timestamp the data. In alternative, timestamping can be carried out in the machine controller 25 or in the external device.

Sensing devices, especially those that are supposed to detect an anomalous tampering, can be configured to operate standalone, with an autonomous energy source, and retain a status of their measurements, at least until it can be transmitted to the machine controller 25 or to an external device. If a wrist is disconnected and disassembled, for example, it can be configured to sense the opening by its light sensors, and to transmit the relative operational information to the machine controller 25 at the next power-up.

According to an important aspect of the invention, the wrist controller is configured to cause reorientation and reposition of the measure probe along a desired trajectory in the operating volume of a CMM. The trajectory is defined by digital commands received from an external unit—such as the controller of the coordinate machine—and is followed in a deterministic way. The deviations from the trajectory are limited by known error at any moments.

While many articulated wrists are configured to react to a general instruction that specifies only the desired final value of the angles $\alpha$ and $\beta$, the articulated wrist of the invention can, preferably, follow a trajectory that specifies not only the final parameters, but also a series of intermediate configurations along the way, to be reached at specified points of time, according to digital commands received.

This can be realised in many ways. Referring to FIG. 4, the machine controller may be configured to issue commands to the wrist controller that cause the wrist controller to switch from the locked state to the free one, and inversely, and to provide a desired orientation of the reorientable elements to the wrist controller (arrow 16) as discussed above. The desired orientation may be expressed through the angle $\beta$ of the first reorientable element relative to the support element, and the angle $\alpha$ of the second reorientable element relative to the first reorientable element, or in any other suitable manner that allows to determine the desired values of $\alpha$ an $\beta$. The wrist controller 15 is programmed to drive the actuators 224 that turn the first and second reorientable element such that their orientations match with the command received from the machine controller 25.

Preferably, the wrist controller 15 implements a digital loop (feedback based) control method that is configured to read the instantaneous angle values from the encoders 225, compare it with the desired value of the angles and operate the actuators 224 to reach and maintain the desired angle values. The control method can be implemented as a PD controller, a PID controller, or in any other suitable manner.

The desired values of the angles $\alpha$ and $\beta$ could be transmitted to the wrist control in form of a series of target positions to be reached at stated instants in time (e.g. formatted as a time schedule), relative to a system clock or to a local clock accessible to the wrist controller. The time information may be specified for each individual target point or given implicitly (for example under the convention that the target point should be reached when the transmission of the next target is expected, if the link between the machine controller 25 and the wrist controller 15 ensures predictable reception times). Possibly, the wrist controller may be configured to generate additional desired values of the angle by interpolating the trajectory between a target point and the next with constant speed, or with given accelerations/decelerations, or following primitive curves or arcs. In this way, the wrist controller causes the probe to follow a trajectory connecting a time series of target points received from the machine controller at stated instants in time. Known system of synchronising time references between the machine controller 25 and the wrist controller 15 may be used.

In a possible implementation, the machine controller, having obtained or generated a measure plan that includes a trajectory for the positioning platform 20 and a succession of orientations of the wrist, sends a time series of desired orientations to the wrist controller 15 at the same time as driving the actuators 22 of the positioning platform 20. The controller 15 tracks the variable angle values provided by the machine controller 25 such that the full kinematic configuration of the reorientable wrist is predictable at any given instant along the trajectory, within a determined error. In implementations, the repetition rate of the time series may be comprised between 10 Hz and 10 kHz, but higher or lower rates may be appropriate in special cases. The inventors have determined that 1 kHz is suitable for most metrology applications.

The actual values of the angles $\alpha$ and $\beta$ provided by the encoders 225 could be fed back to the machine controller that supervises to the motion of the five axes of the system (X, Y, Z, $\alpha$, $\beta$) in real time. The machine controller 25 supervises to the motion of the positioning platform 20 of the CMM and to the orientation of the articulating wrist. In the case of a cartesian CMM, the machine controller implements a 5-axis control with position feedback, the axis being the cartesian axis X, Y, Z and the rotation angles $\alpha$ and $\beta$ of the rotation axis A and B of the wrist.

Advantageously, the wrist controller 15 can be configured to transmit warning messages to the machine controller 25 in determined situations, for example:

No desired orientation has been received within a given deadline time after a command to unlock the wrist No further orientation has been received within a given deadline time after a previous desired orientation.

In both cases, the deadline time may be set preferably between 1 ms and 100 ms, preferably between 2 ms and 10 ms, for example 5 ms.

Preferably, the trajectory for the positioning platform 20 and the successive orientations of the wrist are computed by the machine controller 25 or by a dedicated pre-processor in a manner ensuring that all the desired measurements are collected, the measurement time is optimised, and no collision ensues under reasonable assumptions on the true dimensions and position of the workpiece under measure. Several algorithms are available to achieve this result, provided that the kinematic configuration of the reorientable wrist should be always determinable with enough precision.

In other words, the better the kinematic configuration of the reorientable wrist is known, the closer the probe can remain to the workpiece, and the lower will be the measure time. In the opposite case where the kinematic configuration of the wrist is only poorly known—as is the case in conventional automatic indexed wrists—collisions can be positively avoided only by moving the positioning platform to a position spaced apart from the workpiece, reorienting the probe while the positioning platform is immobile, then resuming the motion of the positioning platform, which necessarily leads to longer times. The inventors have determined that a rigorous closed-loop control of the joint angles and precision mechanical joints are beneficial because they allow faster measurements, even if no coordinate measurement is ever taken while the reorientable elements are turning, as this reduces dead times.

Therefore, the rotational position of such reorientable wrist needs to be controlled to a sufficiently degree of precision that, when rotation axis is at the new desired relative orientation, or close to it, the opposite joints of such axis can be locked together by the locking mechanism. The accuracy of the desired index position for supporting measurement is then provided by the indexing elements or components of the locking mechanism, eventually with the help of an individual or general calibration procedure of the desired indexed position.

To better illustrate this point, FIG. 5 shows an example in which a coordinate machine equipped with the inventive reorientable wrist is used to probe two orthogonal sides of a prismatic workpiece 30. In this simple example only the X, Y coordinates for the positioning platform 20 and the "B" joint of the wrist are variable, for simplicity, but this is not essential. The machine controller 25 is configured to control the configuration of the CMM machine that comprise, for a cartesian CMM, the axis X, Y, Z and the configuration of the articulating wrist, including the rotation angles α, β and the locked/unlocked state of the wrist.

The trajectory of the positioning platform is drawn as 250 and four successive positions of the wrist along the trajectory are shown as 10*a*-10*d*. Starting from the position "A" the wrist, in the locked state, travels parallel to the first face of the workpiece 30. In this segment, the probe travels parallel to the nominal surface with a determined clearance, without touching it. At point "B" the positioning platform is moved closer, the probe taps the surface and collects a measure point. The wrist and probe proceed along the initial line in "C", tap again the surface in "D" and travel along the initial line again until it reaches a point "E" that has been predetermined as the start of a reorientation manoeuvre. In contrast with other measuring systems in which the probe's orientation is variable continuously, the measurement points are collected while the axis "A" and "B" are locked, and the orientation of the probe is fixed in an indexed configuration.

At point "E", optionally, the positioning platform moves away slightly to increase the clearance between the wrist and the workpiece in preparation to the unlocking of the wrist. This is justified because the dimensions of the wrist may change slightly in the transition between the locked state and the free state, and because the geometric uncertainties in the free state are always higher. This additional clearance is exaggerated in the drawings to make it apparent and is achieved at point "F", where the wrist receives a command to unlock. Meanwhile, the platform has continued its motion along the "X" direction towards the edge of the face.

At point "G" the positioning platform deviates from its previous essentially rectilinear trajectory follows an arc (represented as a double line) turning around the edge 33 and at the same time the machine controller sends a series of desired orientations to the wrist controller that cause the first reorientable element to turn, such that the probe follows a smaller arc around the same edge (not drawn), without touching the workpiece 30.

Point "H" is the end of the arc. The positioning platform resumes its linear motion, this time in the "Y" direction, on which the face at the left of the edge 33 lies and a lock command is given to the wrist. After a while, the optional additional clearance is withdrawn, and the positioning platform moves closer to the workpiece 30. At point "I" the reorienting manoeuvre is complete, and the measurement continues with the acquisition of two new data points at "J" and "K".

FIG. 6 is a plot of the commands received by the wrist for the "B" axis (plot 350) and the lock state (plot 360) along the trajectory of the previous example, superimposed to the instantaneous "X" and "X" positions of the platform 20 (plots 370, 380). The machine controller sends the desired values of the β angle synchronously with the corresponding movements of the positioning platform such that the orientation of the wrist follows the succession of orientations predefined in the trajectory.

In a possible implementation, the machine controller can be configured to collect, eventually via the wrist controller, features, capabilities (e.g. predefined abilities), and/or performances (e.g. assessed abilities) of the attached articulated wrist, of the carried measure probe, and/or of accessories thereof apparatus in view of supporting and/or determining a planned trajectory based on such collected data.

The invention allows the machine controller or the dedicated pre-processor to compute (and operate) a measure plan with reorientations of the articulated wrist in synchronization with movements of the positioning platform 20 by a series of desired orientations with or linked to time information, notably a time series of desired orientations, that will be provided to the wrist controller 15 for execution.

Moreover, the invention also allows the machine controller or the dedicated pre-processor to optimize reorientations of the articulated wrist according not only to a knowledge level of kinematic configuration of the articulated wrist, but also to estimated risk of collisions due, for example, to a local concentration of objects, especially in proximity of the articulated wrist and of the attached coordinate probe, in the measurement volume of the measuring apparatus. The measure plan can be thus compute (or executed) to selectively operate a reorientation of the measuring probe in a first operational mode—e.g. when there are a risk of collision and the kinematic configuration of the wrist is less favourable e.g. by an important load caused by the attached coordinate probe where the repositioning of the probe is conducted slower but in a more accurate way, and a in second operational mode—e.g. when the collision risk is estimated as low—where the repositioning of the probe is executed more rapidly but in a less accurate way.

REFERENCE SYMBOLS APPEARING IN THE FIGURES

A-K positions along the trajectory of the positioning platform
x, y cartesian coordinates
β rotation angle of the "B" joint
10 articulating wrist
10*a-d* positions of the articulating wrist
15 wrist controller
16 wrist desired configuration
17 wrist instantaneous configuration
19 lock/unlock command
20 communication interface
22 machine cartesian actuators
23 machine linear encoders
25 machine controller
30 workpiece
33 edge
40 coordinate measuring machine, CMM
41 bridge
42 carriage
43 table
45 Z-ram, quill, positioning platform
60 "A" axis (horizontal)
70 "B" axis (vertical)
100 support element
103 connector
107 slip ring device, slip ring capsule
109 axle
114 upper cable
115 cable harness
120 indexing means, Hirt coupling, "B" axis
125 indexing means, Hirt coupling, "A" axis
150 trajectory of the positioning platform
160 crash detector, capacitive sensor
175 compression spring
190 angle encoder, "B" axis
195 angle encoder, "A" axis
200 first reorientable element
220 visual indicators
224 rotation actuators of the wrist
225 angle encoders of the wrist
226 lock/unlock actuator of the wrist
230 rotation actuator, "A" axis
232 anti-rotation finger, "B" axis
233 anti-rotation finger, slip ring
237 gears
240 rotation actuator, "B" axis
250 trajectory of the positioning platform
252 "B" bearing
253 "B" axle
254 "A" bearing
255 "A" axle
270 crank
272 pull rod, "B" axis
274 pull rod, "A" axis
300 second reorientable element
350 desired angle
360 lock signal
370 X displacement
380 Y displacement
400 stylus, end sensor
415 touch tip

The invention claimed is:

1. Articulating wrist for reorienting a measure probe relatively to a measuring apparatus, including:
- a support element connectable to a positioning platform of a measuring apparatus,
- a first reorientable element pivotably connected to the support element for rotation about a first rotation axis
- a first actuator, actuatable by a wrist controller for rotating the first reorientable element about the first rotation axis,
- a first angle encoder configured to determine an angular position of the first reorientable element relative to the support element and to generate a read orientation,
- a communication interface configured to receive digital commands and data,
- the articulating wrist being configured to operate selectively in either of:
  - a locked mode, in which the first reorientable element is mechanically constrained in one of a finite set of indexed orientations,
  - a free mode, in which the first actuator can turn the first reorientable element, characterized in that:
- the wrist controller is configured to receive, through the communication interface, positioning command conveying a series of desired orientations of the first reorientable element and specified times to attain the desired orientations, and, while the articulated wrist is in the free mode, read the first position, select each of the desired orientations in a time-ordered succession and command the first actuator to move towards the selected desired orientation at the corresponding specified time based on a difference between the read orientation and the selected desired orientation.

2. The articulating wrist of claim 1, wherein the communication interface is configured to retransmit successive values of the read orientation to a controller of the measuring apparatus.

3. The articulating wrist of claim 1, wherein the first actuator is comprised in the first reorientable element and is capable of unbound rotation, the support element comprising one or more slip rings for transmitting the power and/or the electric actuation contacts from the support element to the first reorientable element.

4. The articulating wrist of claim 3, wherein the slip ring transmits also optical signals and/or pressurised fluid from the support element to the first reorientable element.

5. The articulating wrist of claim 1, having an indexed coupling between the support element and the first reorientable element, the indexed coupling comprising a plurality of mobile positioning elements united with the first reorientable element, a plurality of fixed positioning element united with the support element and capable of engaging with the mobile positioning element to define a plurality of predetermined indexed orientations of the first reorientable element relatively to the support element, the articulating wrist further comprising a locking actuator controlled by the wrist controller, actuatable to cause one of:
- in the free mode, an axial separation between the mobile positioning elements and the fixed positioning elements, whereby the first reorientable element can be turned by the first actuator relative to the support element, or
- in the locked mode, a mutual engagement between the mobile positioning elements and the fixed position elements, whereby the first reorientable element assumes one of the indexed orientations.

6. The articulated wrist of claim 5, the locking actuator comprising a hollow body configured to bias the mobile positioning elements against the fixed positioning elements in the locked mode and to separate the mobile positioning elements from the fixed positioning elements in the free mode, the hollow body providing a passage for electric and/or optical and/or fluid conductors between the support and the first reorientable element.

7. The articulating wrist claim 1, the wrist controller being configured to switch between the locked state and the free state and conversely in response to commands received through the communication interface.

8. The articulating wrist of claim 1, wherein the wrist controller is configured to operate in a legacy mode in which upon reception of a final orientation through the communication interface, the wrist controller sets the wrist in the free state, command the actuator to rotate the first reorientable element until the final orientation is reached, sets the wrist in the locked state, optionally sends an acknowledgement message through the communication interface.

9. The articulating wrist of any claim 1, comprising at least one sensor from the group of: temperature sensor, humidity sensor, acceleration sensor, gyroscope sensor, luminosity sensor, motor current sensor, capacitive crash sensor.

10. The articulating wrist of claim 1, comprising:

- a second reorientable element pivotably connected to the first reorientable element for rotation about a second rotation axis, essentially orthogonal to said first rotation axis,
- a second actuator in the first reorientable element, actuatable to cause the second reorientable element to turn about the second rotation axis,
- a connector on the second reorientable element for affixing a measuring probe,
- a second angle encoder configured to determine an angular position of the second reorientable element relative to the first reorientable element and to generate a second read orientation,
- the positioning command specifying a series of desired orientations first reorientable element relative to the support element and of the second reorientable elements relative to the first reorientable elements, the wrist controller being configured to read the read orientation and the second read orientation, select each of the desired orientations of the first reorientable element relative to the support element and of the second reorientable elements relative to the first reorientable elements in a time-ordered succession and command the first actuator and the second actuator to move towards the selected desired orientations at the corresponding specified time based on differences between the read orientation and the selected orientation of the first reorientable element relative to the support and between the second read orientation and the selected orientation of the second reorientable element relative to the first reorientable element.

11. A measuring apparatus consisting in a coordinate measuring machine in a machine tool or in a robot, the measuring apparatus comprising a mobile positioning platform controlled by an apparatus controller, the articulated wrist of any one of the preceding claims being attached to the mobile positioning platform, and a measure probe connected to the articulating wrist for measuring a workpiece with the measuring apparatus; wherein the apparatus controller is configured to: determine a planned trajectory comprising a series of instantaneous configurations, each configuration determining a position of the mobile positioning platform and an orientation of the articulated wrist carrying the measure probe, control the positioning platform so as to translate the positioning platform following the succession of positions defined in the planned trajectory in a time-ordered fashion, and to send commands to the wrist controller such that at the same time as the positioning platform is translated, the measure probe is rotated by the articulated wrist following the succession of orientations defined in the planned trajectory synchronously with the corresponding translations of the positioning platform.

12. The measuring apparatus of claim 11, wherein the apparatus controller is configured to send commands to the wrist controller such that the wrist controller selects the free state of the wrist in preparation of a change of wrist orientation or the locked state of the wrist in preparation to a measurement with the measure probe.

13. A method of operating a measuring apparatus having a mobile positioning platform controlled by an apparatus controller, the articulating wrist of any one of the claims 1 to 10 attached to the mobile platform, a measure probe connected to the articulating wrist for measuring a workpiece with the measuring apparatus, the method comprising: determining a planned trajectory comprising a series of instantaneous configurations, each configuration determining a position of the mobile positioning platform and an orientation of the wrist carrying the measure probe, controlling of the positioning platform by the apparatus controller so as to translate the positioning platform following the succession of positions defined in the planned trajectory in a time-ordered fashion, sending commands from the apparatus controller to the wrist controller such that at the same time as the positioning platform is translated, the measure probe is rotated by the wrist following the succession of orientations defined in the planned trajectory synchronously with the corresponding translations of the positioning platform.

14. The method of claim 13, comprising sending commands from the apparatus controller to the wrist controller such that the wrist controller selects the free state of the wrist in preparation of a change of wrist orientation or the locked state of the wrist in preparation to a measurement with the measure probe.

15. The method of claim 13, wherein the instantaneous configurations are transmitted by the apparatus controller to the wrist controller periodically with a period lower than 100 ms, preferably lower than 10 ms more preferably equal to 1 ms.

16. The method of claim 13, comprising retransmitting successive values of the read orientation from the wrist controller to the apparatus controller, determining an actual configuration of the measuring apparatus based on the values of the read orientation and on a read position of the positioning platform determined through position encoders of the measuring apparatus, determining a difference between the actual configuration and a desired instantaneous configuration of the planned trajectory, sending from the apparatus controller to the wrist controller and/or to actuators of the measuring apparatus moving the positioning platform instructions tending to bring the difference to zero.

17. The method of claim 13 wherein the measuring apparatus is constituted by a coordinate measuring machine, or by a machine tool, or by a robot.

* * * * *